(12) United States Patent
Debiez et al.

(10) Patent No.: US 6,529,997 B1
(45) Date of Patent: Mar. 4, 2003

(54) APPARATUS AND METHOD FOR WRITING AND READING DATA TO AND FROM A VIRTUAL VOLUME OF REDUNDANT STORAGE DEVICES

(75) Inventors: Jacques Debiez, Cugnaux (FR); Charles Allen Milligan, Golden, CO (US); James Prescott Hughes, Lino Lakes, MN (US)

(73) Assignee: Storage Technology Corporation, Louisville, CO (US)

( * ) Notice: Subject to any disclaimer, the term of this patent is extended or adjusted under 35 U.S.C. 154(b) by 199 days.

(21) Appl. No.: 09/638,205

(22) Filed: Aug. 11, 2000

(51) Int. Cl.$^7$ .............................................. G06F 12/00
(52) U.S. Cl. ..................................................... 711/114
(58) Field of Search ....................... 711/111, 114; 714/6

(56) References Cited

U.S. PATENT DOCUMENTS 5,530,948 A * 6/1996 Islam
5,960,169 A * 9/1999 Styczinski .................. 711/114
6,282,670 B1 * 8/2001 Rezaul Islam et al. ..... 711/114

* cited by examiner

*Primary Examiner*—Jack A. Lane
(74) *Attorney, Agent, or Firm*—Carstens, Yee & Cahoon, L.L.P.

(57) ABSTRACT

An apparatus and method for writing and reading data to and from a virtual volume of redundant storage devices is provided. The apparatus and method make use of metadata identifying the number of data storage devices and number of parity storage devices in the virtual volume of redundant storage devices. In addition, other metadata, such as the identity of the data storage devices and parity storage devices may be utilized. The metadata is stored with each block written to each of the storage devices. In the event of a failure of a storage device, the metadata is modified to reflect the failure and the storage device to which the data intended for the failed storage device was written. In this way, if a failure of a storage device is encountered, each block in the virtual volume of redundant storage devices has enough information in the metadata to identify where to find the data that was intended for the failed storage device. Thus, reconstruction of data using parity information is not required.

52 Claims, 9 Drawing Sheets

| 0 | P2 | P1 | P0 | 7 | 6 | 5 | 4 | 3 | 2 | 1 | 0 | P2 | P1 | P0 | 7 | 6 | 5 | 4 | 3 | 2 | 1 | 0 |
| 1 | 0 | P2 | P1 | P0 | 7 | 6 | 5 | 4 | 3 | 2 | 1 | 0 | P2 | P1 | P0 | 7 | 6 | 5 | 4 | 3 | 2 | 1 |
| 2 | 1 | 0 | P2 | P1 | P0 | 7 | 6 | 5 | 4 | 3 | 2 | 1 | 0 | P2 | P1 | P0 | 7 | 6 | 5 | 4 | 3 | 2 |
| 3 | 2 | 1 | 0 | P2 | P1 | P0 | 7 | 6 | 5 | 4 | 3 | 2 | 1 | 0 | P2 | P1 | P0 | 7 | 6 | 5 | 4 | 3 |
| 4 | 3 | 2 | 1 | 0 | P2 | P1 | P0 | 7 | 6 | 5 | 4 | 3 | 2 | 1 | 0 | P2 | P1 | P0 | 7 | 6 | 5 | 4 |
| 5 | 4 | 3 | 2 | 1 | 0 | P2 | P1 | P0 | 7 | 6 | 5 | 4 | 3 | 2 | 1 | 0 | P2 | P1 | P0 | 7 | 6 | 5 |
| 6 | 5 | 4 | 3 | 2 | 1 | 0 | P2 | P1 | P0 | 7 | 6 | 5 | 4 | 3 | 2 | 1 | 0 | P2 | P1 | P0 | 7 | 6 |
| 7 | 6 | 5 | 4 | 3 | 2 | 1 | 0 | P2 | P1 | P0 | 7 | 6 | 5 | 4 | 3 | 2 | 1 | 0 | P2 | P1 | P0 | 7 |
| P0 | 7 | 6 | 5 | 4 | 3 | 2 | 1 | 0 | P2 | P1 | P0 | 7 | 6 | 5 | 4 | 3 | 2 | 1 | 0 | P2 | P1 | P0 |
| P1 | P0 | 7 | 6 | 5 | 4 | 3 | 2 | 1 | 0 | P2 | P1 | P0 | 7 | 6 | 5 | 4 | 3 | 2 | 1 | 0 | P2 | P1 |
| P2 | P1 | P0 | 7 | 6 | 5 | 4 | 3 | 2 | 1 | 0 | P2 | P1 | P0 | 7 | 6 | 5 | 4 | 3 | 2 | 1 | 0 | P2 |

| Storage Device | | | | | | | | | | | |
|---|---|---|---|---|---|---|---|---|---|---|---|
| STORAGE DEVICE | 0 | P2 | P1 | P0 | 7 | 6 | 4 | 3 | 2 | 1 | 0 | P1 |
| STORAGE DEVICE | 1 | 0 | P2 | P1 | P0 | 7 | 5 | 4 | 3 | 2 | 1 | 0 |
| STORAGE DEVICE | 2 | 1 | 0 | P2 | P1 | P0 | 6 | 5 | 4 | 3 | 2 | 1 |
| STORAGE DEVICE | 3 | 2 | 1 | 0 | P2 | P1 | 7 | 6 | 5 | 4 | 3 | 2 |
| STORAGE DEVICE | 4 | 3 | 2 | 1 | 0 | P2 | P0 | 7 | 6 | 5 | 4 | 3 |
| STORAGE DEVICE | 5 | 4 | 3 | 2 | 1 | 0 | P1 | P0 | 7 | 6 | 5 | 4 |
| STORAGE DEVICE | 6 | 5 | 4 | 3 | 2 | 1 | 0 | P1 | P0 | 7 | 6 | 5 |
| STORAGE DEVICE (401) | 7 | 6 | 5 | 4 | 3 | 2 | ░ | ░ | ░ | ░ | ░ | ░ |
| STORAGE DEVICE (402) | P0 | 7 | 6 | 5 | 4 | 3 | 1 | 0 | P1 | P0 | 7 | 6 |
| STORAGE DEVICE | P1 | P0 | 7 | 6 | 5 | 4 | 2 | 1 | 0 | P1 | P0 | 7 |
| STORAGE DEVICE | P2 | P1 | P0 | 7 | 6 | 5 | 3 | 2 | 1 | 0 | P1 | P0 |

*FIG. 4A*

| | | | | | | | | | | | | |
|---|---|---|---|---|---|---|---|---|---|---|---|---|
| STORAGE DEVICE | 0 | P2 | P1 | P0 | 7 | 6 | 3 | 2 | 1 | 0 | P2 | P1 |
| STORAGE DEVICE | 1 | 0 | P2 | P1 | P0 | 7 | 4 | 3 | 2 | 1 | 0 | P2 |
| STORAGE DEVICE | 2 | 1 | 0 | P2 | P1 | P0 | 5 | 4 | 3 | 2 | 1 | 0 |
| STORAGE DEVICE | 3 | 2 | 1 | 0 | P2 | P1 | 6 | 5 | 4 | 3 | 2 | 1 |
| STORAGE DEVICE | 4 | 3 | 2 | 1 | 0 | P2 | P0 | 6 | 5 | 4 | 3 | 2 |
| STORAGE DEVICE | 5 | 4 | 3 | 2 | 1 | 0 | P1 | P0 | 6 | 5 | 4 | 3 |
| STORAGE DEVICE | 6 | 5 | 4 | 3 | 2 | 1 | P2 | P1 | P0 | 6 | 5 | 4 |
| STORAGE DEVICE (401) | 7 | 6 | 5 | 4 | 3 | 2 | ░ | ░ | ░ | ░ | ░ | ░ |
| STORAGE DEVICE (402) | P0 | 7 | 6 | 5 | 4 | 3 | 0 | P2 | P1 | P0 | 6 | 5 |
| STORAGE DEVICE | P1 | P0 | 7 | 6 | 5 | 4 | 1 | 0 | P2 | P1 | P0 | 6 |
| STORAGE DEVICE | P2 | P1 | P0 | 7 | 6 | 5 | 2 | 1 | 0 | P2 | P1 | P0 |

APPARATUS AND METHOD FOR WRITING AND READING DATA TO AND FROM A VIRTUAL VOLUME OF REDUNDANT STORAGE DEVICES

FIELD OF THE INVENTION

The present invention is directed to an apparatus and method for writing and reading data to and from a virtual volume of redundant storage devices. In particular, the present invention is directed to an apparatus and method in which metadata is stored for every block in a superblock written to a plurality of physical storage devices, such that a data volume may be easily rebuilt from any arbitrary subset of the redundant storage devices.

BACKGROUND OF THE INVENTION

To improve the performance of removable media, such as magnetic tapes and magnetic disks, the most efficient and known method is to build a Redundant Array of Independent Removable (RAIR) storage devices. Such arrays can provide increased throughput by striping data over multiple media located in multiple redundant storage devices. Additionally, these arrays of redundant storage devices can provide increased reliability by adding a parity mechanism used to correct for errors in reading/writing data to the media.

Redundant Array of Independent Tape (RAIT) systems are the tape implementation of a RAIR storage system. RAIT systems use a plurality of tape drives to improve the performance and reliability of the storage medium. Data may be striped across many tape drives to increase performance. However, the drawback is that any tape error renders the complete stripe group unreadable. Thus, when a storage device in the array of redundant storage devices fails, the data being written to or read from the failed storage device must be reconstructed.

A method for reconstructing missing data using cross-parity stripes on a storage medium, such as magnetic tape media, is described in commonly assigned and co-pending U.S. patent application Ser. No. 09/490,258 entitled "Apparatus and Method for Reconstructing Missing Data Using Cross-Parity Stripes on Storage Media" filed Jan. 24, 2000, which is hereby incorporated by reference. The apparatus and method described in U.S. patent application Ser. No. 09/490,258 makes use of a plurality of parity stripes for reconstructing missing data stripes. The parity symbol values in the parity stripes are used as a basis for determining the value of the missing data symbol in a data stripe. A correction matrix is shifted along the data stripes, correcting missing data symbols as it is shifted. The correction is performed from the outer most data stripes towards the inner data stripes to thereby use previously reconstructed data symbols to reconstruct other missing data symbols.

The data is reconstructed by organizing the received parity stripes in order. The smallest slope diagonal lines of the correction matrix, representing the linear equations of the parity symbols, may be used to correct the top and bottom most missing data stripes as deep as is necessary. Once the top and bottom most data stripes are corrected, the next largest slope lines may be used to correct the next inner missing data stripe and so forth until all the missing data stripes are corrected.

The use of parity stripes and parity symbols to reconstruct missing data, while beneficial, may greatly reduce the throughput of the overall RAIR system. Thus, it would be beneficial to have an apparatus and method that compensates for failures in storage devices without compromising the throughput of the overall RAIR system. In addition, it would be desirable to be able detect and reconstruct the failures in the system offline to the actual processing of the data in behalf of a using application.

SUMMARY OF THE INVENTION

The present invention provides apparatus and method for writing and reading data to and from a virtual volume of redundant storage devices. The apparatus and method make use of metadata identifying the number of data storage devices and number of redundancy storage devices in the virtual volume of redundant storage devices. In addition, other metadata, such as the identity of the data storage devices and parity storage devices may be utilized. The metadata is stored with each block written to each of the storage devices. In the event of a failure of a storage device, the metadata is modified to reflect the failure and the storage device to which the data intended for the failed storage device was written. In this way, if a failure of a storage device is encountered, each block in the virtual volume of redundant storage devices has enough information in the metadata to identify where to find the data that was intended for the failed storage device. Thus, reconstruction of data using redundancy information is not required.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is an exemplary diagram illustrating an operation of one embodiment of the present invention when a storage device in the array of storage devices fails;

FIG. 4B is an exemplary diagram illustrating an operation of an alternative embodiment of the present invention when a storage device in the array of storage devices fails;

FIG. 6 is an exemplary diagram of additional information that may be included in the superblock header;

DETAILED DESCRIPTION OF THE PREFERRED EMBODIMENT

Figure 1:
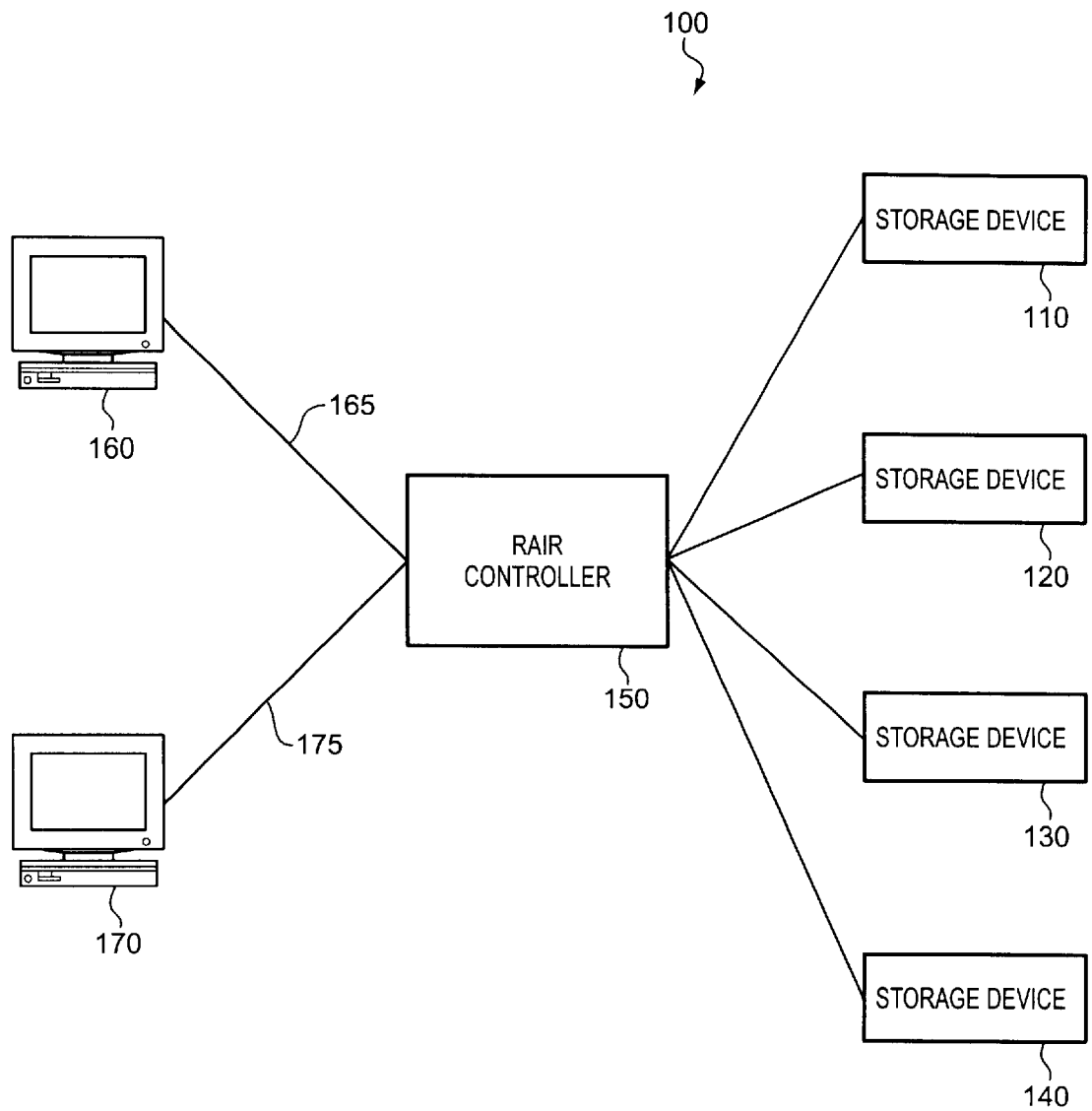
FIG. 1 is an exemplary block diagram of a data processing system according to the present invention.

FIG. 1 is an exemplary block diagram of a Redundant Array of Independent Removable (RAIR) storage system 100 according to the present invention. As shown in FIG. 1, the RAIR system 100 includes a plurality of redundant storage devices 110–140, a RAIR controller 150, and a plurality of user devices 160 and 170.

The RAIR controller 150 controls the reading and writing of data across the plurality of redundant storage devices 110–140. The PAIR controller 150 performs the functions described herein with regard to determining superblock headers, sending superblock header information, data and parity information to the redundant storage devices 110–140 to be written to the storage media, modifying superblock headers, and the like. The RAIR controller 150 includes a processor 151, and input device 152, an output device 153, and a main memory 154. The processor 151 operates under the guidance of programs stored in main memory 154. The processor 151 performs the functions described herein, to data and parity information input via the input device 152 and output via the output device 153.

The user devices 160 and 170 may be any type of data processing system capable of sending and receiving data from the plurality of redundant storage devices 110–140 via the PAIR controller 150. For example, the user devices 160 and 170 may be mainframe computers, personal computers, network computers, workstations, personal digital assistants, and the like.

The user devices 160 and 170 send and receive data to the RAIR controller 150 via the communication links 165 and 175. The communication links 165 and 175 may be any type of data transfer communication links. For example, the communication links 165 and 175 may be parallel or serial cables, co-axial cables, fiber optic cables, wireless communication links, and the like. The communication links 165 and 175 may further be part of a network such as a local area network, wide area network, intranet, the Internet, satellite communication network, and the like.

The redundant storage devices 110–140 may be any type of storage device that reads/writes data to a storage medium. The storage medium may be, for example, magnetic tape, magnetic disk, optical disk, CD-ROM, rewriteable CD-ROM, DVD, Magneto-optical medium, magnetic disk or tape cartridge, or the like. The storage medium used in the redundant storage devices 110–140, in the depicted example, is removable, although the invention is not limited to such an embodiment. Rather, the invention may be applied to any redundant storage system in which data is written to storage medium across a plurality of redundant storage devices.

The storage medium, in a preferred embodiment, is removable and replaceable via, for example, automation such as robotic arm assemblies (not shown) which may retrieve and replace storage medium from a library of storage medium and insert the storage medium into a respective redundant storage device 110–140. Thereafter, data may be written to or read from the storage medium under the control of RAIR controller 150.

It should be noted that the redundancy technique used as an example in the exemplary embodiments herein is specifically angular parity, but various other redundancy mechanisms can be employed and also a mixture of redundancy mechanisms could be employed without departing from the spirit and scope of the present invention. Wherever parity is used in the following exemplary embodiments, Reed Solomon redundancy calculations could be employed or any other mechanism that uses a set of discrete elements to develop a redundancy block for later reconstruction of a lost piece of data.

The following description of the preferred embodiments of the invention will reference the storage device and the storage medium interchangeably. For purposes of this description, when the term storage device is utilized, what is meant is the storage device having a removable storage medium loaded therein. Thus, if data is written to a storage device, what is meant is that the data is sent to the storage device, which writes the data to the loaded storage medium.

To the user devices 160 and 170, the plurality of redundant storage devices 110–140 are seen as a single virtual volume 190 to which data is written and from which data is read. Thus, even though there are numerous physical storage devices employed, the user devices 160 and 170 access the physical storage devices as if they were a single, very fast, large and reliable, storage device.

The virtual volume 190 is a group of n+p physical volumes, i.e. physical storage devices, where n is the data stripping width and p is the number of parity stripes. The examples of the present invention will assume a data stripping width of 8, i.e. the number of data tracks, and the number of parity stripes to be 3, i.e. the number of parity tracks used for error correction. Thus, the following examples will assume n=8 and p=3, although the present invention is applicable to any relevant number of parity stripes and any data stripping width.

Figure 2:
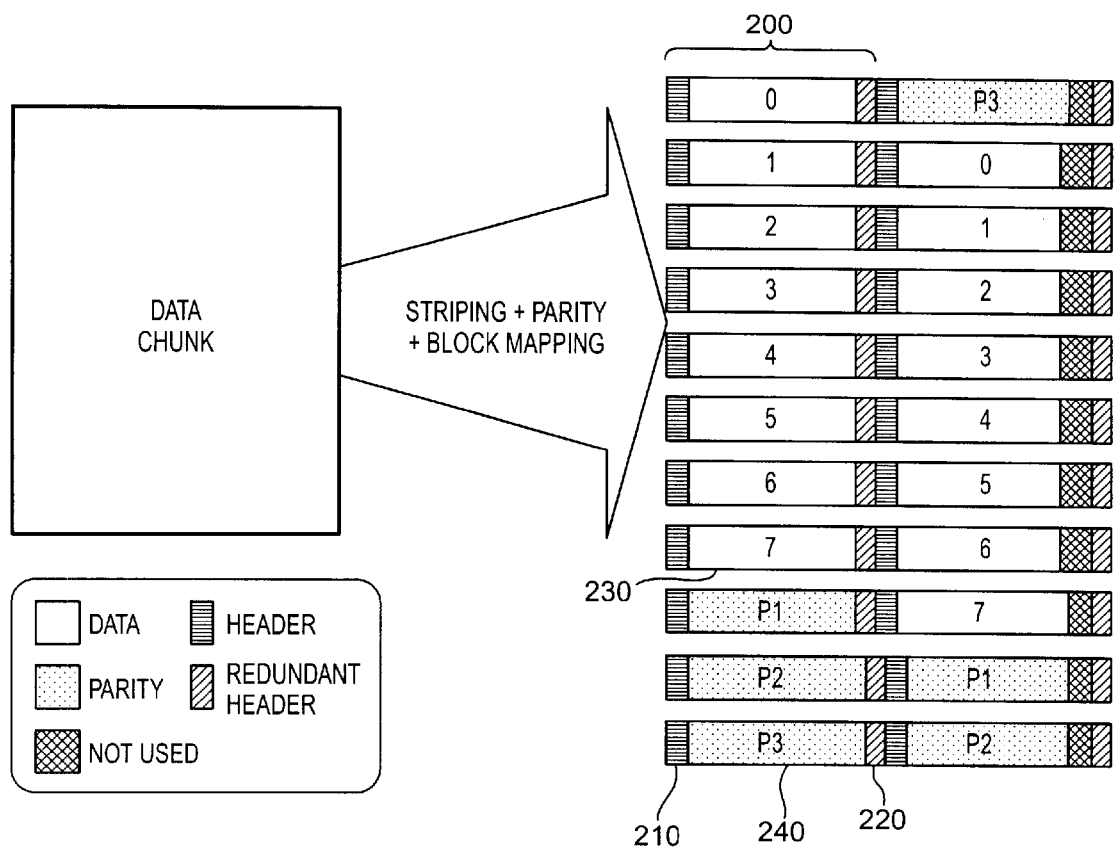
FIG. 2 is an exemplary diagram illustrating the manner in which a data chunk is striped with data and parity information and mapped to superblocks which are then striped across a plurality of storage devices in a virtual volume.

FIG. 2 is an exemplary diagram illustrating the manner in which a data chunk is striped with data and parity information and mapped to superblocks which are then striped across a plurality of storage devices in a virtual volume, such as storage devices 110–140. As shown in FIG. 2, each chunk of data is broken up and mapped into superblocks for storage on the plurality of storage devices. The mapping of data into superblocks is generally known in the art and thus, a detailed description of this process is not provided here. An example of using superblocks can be found in the StorageTek subsystems employing 36 track tape devices.

In order to avoid the too often employment of gaps between small records, the records written to the RAIR subsystem from the host system are concatenated and written as one large superblock. A superblock is a set of n+p physical blocks. Each physical block is written to one of the storage devices in the array of storage devices. Thus, for example, the physical blocks 0–7 and P0–P3 represent a single superblock 200. The physical block length can be fixed or variable. For purposes of the present description, it is assumed that the physical block lengths are fixed.

With the present invention, each block in the superblock 200 starts or ends with a 'header' 210. The header can be optionally repeated, as a redundant header 220, at the end of each physical block for checking and redundancy purposes. For any of the physical blocks inside the superblock 200, the header 210 is identical from one block to the next, with the exception of the occurrence of a failure as will be discussed in detail hereafter.

Between the header 210 of the block and the redundant header 220, or header 210 of the next block, is the data 230 or parity information 240 that is to be written to the storage device. Because the amount of data or parity information that is written to the storage device may vary, in order to maintain a fixed physical block length, there may be unused portions 250 of the physical block. This is offset by allowing the subsystem to span the records, written by the using host system to the subsystem, across superblock boundaries. Thus, the records, as seen from the host point of view, can be arbitrarily large compared to the superblock size.

The header 210 may include sufficient information for reconstructing the superblock 200 should an error occur in the writing or reading of information to or from the plurality of storage devices. The header 210 may include any information that may be utilized for determining the superblock 200. However, as minimum header information, the header 210 may include the following information in the following format:

{vv, n, p, k, $pvidd_0$ ... $pvidd_{n-1}$, $pvidp_0$ ... $pvidp_{p-1}$}
where:

| | |
|---|---|
| vv | is the virtual volume identification; |
| n | is the number of data stripes; |
| p | is the number of parity stripes; |
| k | is the present superblock sequence number; |
| $pvidd_i$ | is the physical volume identifier for a data stripe I, I = 0 ... n − 1; and |
| $pvidp_j$ | is the physical volume identifier for a parity stripe j, j = 0 ... p − 1. |

The header 210 shown above represents a minimum amount of information that may be stored in the header according to the present invention. Additional information may be included in the header to make the header more versatile, as will be described hereafter.

From the header 210 information, the RAIR system can determine the virtual volume to which the data is written (vv), the number of data stripes that are written (n), the number of parity stripes that are written (p), the position of this superblock in a sequence of superblocks being written to or read from the storage device (k), and the particular storage devices on which the data and parity information are stored ($pvidd_i$ and $pvidp_j$). The virtual volume may be used to determine which physical storage devices to be included in the array of storage devices to which data is written to or read from. The number of data stripes and parity stripes provides the system with an indication of what to expect when writing to or reading from the array of storage devices. The superblock sequence number provides an indication of which superblocks preceded the current superblocks and which superblocks are to follow the current superblock. This information may be used should an error occur in the reading or writing of the superblock.

The data and parity information storage device identifiers may be used as an indication from which set of storage devices data and parity information is to be written or read from. The set of storage devices used can be changed for each superblock thus allowing for dynamic mapping of the superblocks across different sets of storage devices.

Thus, for example, in the superblock 200 of FIG. 2, the header 210 may take the form of:

{1, 8, 3, 101, 0–7, 8–10}

The header 210 shown above represents a virtual volume identified as virtual volume 1. The virtual volume 1 has 8 data stripes, i.e. 8 data storage devices, and 3 parity stripes, i.e. 3 parity storage devices. The superblock 200 is number 101 in a sequence of superblocks, i.e. the superblock 200 is between superblocks 100 and 102 in the sequence. The storage devices that store data corresponding to the superblock 200 are storage devices 0–7. The storage devices that store parity information corresponding to the superblock 200 are storage devices 8–10. As is apparent to those of ordinary skill in the art, the header described above, when implemented by a computer system, will be in a data format such as binary, hexadecimal, or the like.

Figure 3:
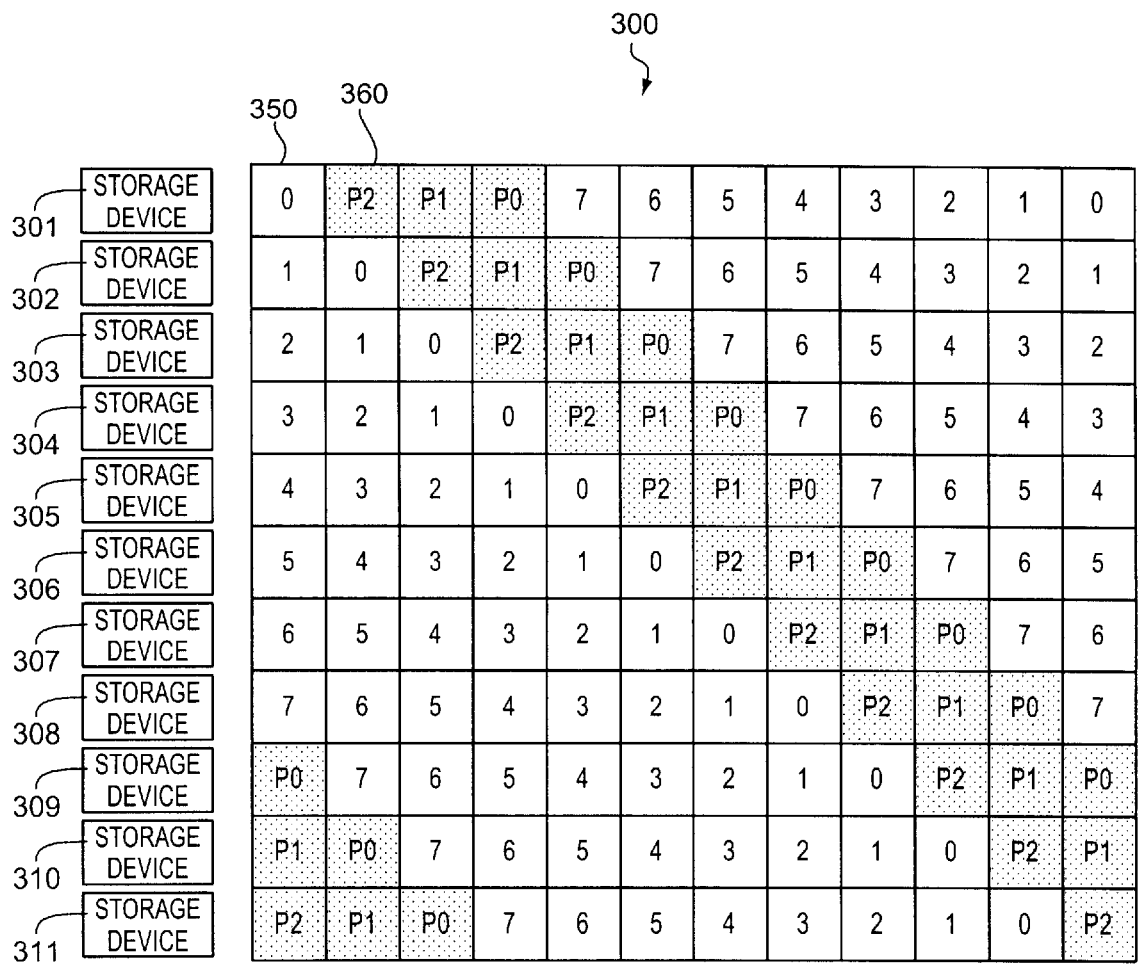
FIG. 3 is an exemplary diagram illustrating a write rotation with regard to an array of storage devices in a virtual volume.

With the present invention, a data chunk is written to and read from a plurality of storage devices, such as the plurality of redundant storage devices 110–140, in a rotating manner such as shown in FIG. 3. As shown in FIG. 3, the array of redundant storage devices 300, in this example, includes 8 data storage devices and 3 parity storage devices, for a total of 11 storage devices (n=8, p=3, n+p=11). Each row of the storage device array 300 shown in FIG. 3 represents a single physical storage device 301–311. All of the rows, and hence all of the physical storage devices, constitute a virtual volume, such as virtual volume 190. The non-shaded blocks numbered 0–7 in FIG. 3 represent data storage devices to which data is written or from which data is read. The shaded blocks numbered P0–P2 represent parity storage devices to which parity information is written or from which parity information is read. For purposes of the following description, only a write operation to the array of storage devices 300 will be described in detail. However, as will be apparent to those of ordinary skill in the art, the principles of the invention are also applicable to a read operation.

As shown, the data and parity information are written to the array of storage devices 300 in a rotating manner. Thus, for example, a data stripe 0 value is written to the first storage device 301 during a first write event. During the next write event, parity information P2 is written to the first storage device 301 while a data stripe 0 value is written to the second storage device 302.

The parity information will not be as easily compressed as the data since the parity generation process randomizes the parity information. Therefore when compression is turned on at the drive level, an algorithmic method of distributing the writing of data and parity information, e.g., rotation, among the storage devices helps assure that the storage capacity of all of the storage devices 301–311 is reached at approximately the same time.

For example, if a specific set of storage devices were always used to store the parity information while other storage devices were always used to store the data, the storage capacity of the parity storage device would be reached much earlier than the data storage devices. Therefore, in order to assure approximately the same amount of storage space on each storage device 301–311 for any given time, the data and parity information are written to the storage devices 301–311 in an algorithmically determined manner. For the description of the preferred embodiment, it will be assumed that an rotating algorithmic mechanism is utilized.

The parity information is used when, for example, data is corrupted and must be reconstructed. As is well known in the art, the parity information provides information from which, along with other uncorrupted data, the corrupted data may be reconstructed. A method of using parity information for reconstructing corrupted data is described in the incorporated U.S. patent application Ser. No. 09/490,258. Other parity methods may be utilized without departing from the spirit and scope of the present invention.

As information is written to the array of physical storage devices 300, header information, such as header 210, indicating the number of data stripes and parity stripes as well as which storage devices store the data stripes and parity stripes is written to the storage devices for each block of information. Thus, for example, the header of the first superblock 350 may have the format {1, 8, 3, 101, 0–7, 8–10}. The header for the second superblock 360 may have the format {1, 8, 3, 102, 1–8, 0 and 9–10} indicating that the superblock 360, relative to superblock 350, is in the same volume, has the same number of data and parity stripes, is the next superblock in a sequence of superblocks, and has different physical devices storing the data and parity information.

The headers for the superblocks will change based on the virtual volume, number of data and parity stripes, superblock sequence number, and physical devices storing the data and parity information, as the superblocks are written to the virtual volume. However, each superblock header may be used to identify the superblock and the location of data and parity information for the superblock virtually independent of the other superblocks.

During writing or reading of information from a virtual volume, one or more of the physical storage devices in the array of storage devices may fail due to any number of reasons. The failure of a storage device may be determined, for example, based on an interrogation of the storage device prior to writing a superblock to the array of storage devices or may be determined based on the failure of a write attempt to the storage device.

If a failure of a storage device is encountered during the writing of data to the array of storage devices for an individual superblock, there are several possible techniques to compensate for the failure: (1) abandon the data that is to be written to the failed storage device for the affected superblock or set of superblocks buffered in the system and do not use any replacement, i.e. reduce the number of data storage devices, and recreate the lost data using parity information; (2) reduce the number of parity storage devices and allocate a parity device for the writing of data and write the data intended for the failed storage device to the storage device that would have stored the parity information; (3) restripe the superblocks affected to use fewer devices; or (4) write the data intended for the failed storage device to a spare storage device. In any of the above three cases, the header information for a superblock accurately identifies where the data and parity information for the superblock can be located in view of the failed storage device.

The first technique set forth above is generally known in the art and is described, for example, in the incorporated U.S. patent application Ser. No. 09/490,258. Thus, this technique will not be further described here in detail. Suffice it to say, the first technique makes use of parity information to recreate the lost data when reading the data from the storage medium.

The second technique is illustrated in FIG. 4A. As shown in FIG. 4A, during the writing of the seventh superblock, the storage device 401 fails. As a result, the number of parity stripes and thus, the number of parity storage devices is reduced from 3 to 2. The data that would have been written to storage device 401 is instead directed to storage device 402 and the rotation of the writing of data and parity information is continued with storage device 402. The storage device 401 is removed from the rotation until an indication is received that the storage device 402 is once again operational.

The writing of the data that would have been written to storage device 401, to the storage device 402, is facilitated by the use of a buffer (not shown). In other words, as the data is being provided to the redundant array of storage devices for writing to the storage medium, the data is initially buffered. The buffer may be either in a controller system of the redundant array of storage devices, such as RAIR controller 150 for example, or in the storage devices themselves. In either case, in the event of a failure to write the data to a storage device, the data is not necessarily lost and may be recovered from the buffer. Thus, if a failure of a storage device is encountered, the data may be retrieved from the buffer and written to another location, such as a storage device designated for parity information, a spare storage device, or the like.

There are several methods for synchronizing the discovery of a failed device with the writing of the data to a reduced set of drives using the second or fourth methods described above:

1) each block written for a superblock is self consistent and contains metadata that describes its relationship to all the other blocks in the superblock. Therefore, when a read is expecting to encounter a P2 block and instead encounters a block that is a data block (in FIG. 4A this would be data block 0), the RAIT system can, by convention or by specifically changing the metadata or by adding change notation to the metadata, assume that there has been an on the fly remapping of the use of the devices. This remapping is reflected in the metadata that is stored in subsequent superblocks;

2) at the point of failure, a new block is appended to the end of each of the data and parity blocks already written in the superblock. This new block is only a metadata block. The inserted metadata block describes the new mapping. An identical metadata block would then be placed both before and after the block that was moved to an alternative drive. When the subsystem reads the blocks from the various media at a later date, it would encounter the inserted metadata description instead of the expected P2 block and from that, discover that there had been a remapping and use the inserted block to understand the new structure and verify consistency. This method is less desirable than the first method from a performance standpoint since it requires additional writing of additional blocks. However it does provide a greater degree of consistency checking. Both methods could be supported in a single product with the choice being directed via installation settings more dynamically done by policy statements communicated independently to the subsystem at volume definition or even at mount time; and 3) another method is to back-up each of the devices, reconstruct the metadata in each block to reflect the new mapping, and write the data and parity information in the new mapping format. This approach is the least desirable since it requires significant delay for the rewrite.

As a result of the failure of storage device 401, the header of the superblock changes to reflect the loss of the storage device 401. The header of the superblock may change, for example, from {1, 8, 3, 101, 0–1 . . . 5–10, 2–4} for the sixth superblock to {1, 8, 2, 102, 0–3 . . . 6 . . . 8–10, 4–5} for the seventh superblock. Thus, the header may change to reflect a change from 3 parity stripes to 2 parity stripes and the removal of the failed storage device 401 from the rotation.

During a read operation for reading the data from the redundant array of storage devices, the header information will inform the control system that it is to expect to receive eight stripes of data and three stripes of parity information and which devices will contain which data/parity information. Thus, the control system can perform a check to determine if the data that is being read is the data that is expected to be read from the storage device.

When storage device 401 is encountered, the control system will not be able to read any data from the storage device 401. The control system will continue to read data and, once data is read from storage device 402, will determine that it expected parity information from storage device 402 but received data instead. However, the header of the superblock for storage device 402 will have been modified to identify the fact that the data in storage device 402 was supposed to be written to storage device 401. Thus, the control system will be informed that the data in storage device 402 is consistent due to the failure of storage device 401 and will be able to interpret the data accordingly.

In this way, the header provides enough information to identify where the data and parity information for the superblock is located. Thus, even with storage device failures, the data and parity information can be stored and retrieved from the storage medium. Since there is no loss of data during such operation, there is no need for the recreation of data using parity information. As a result, the degradation in performance experienced due to recreation of data using parity information is avoided by use of the present invention. Thus, the overall throughput of the RAIR system according to the present invention is improved over known systems.

FIG. 4B illustrates the third method of handling a failed device. In this case the instance of failure is handled exactly as with the second method where the data block replaces the highest order parity block. However, subsequent data is striped with one less data drive and the highest order parity data is reinstated in the mapping. Thus, rather than reducing the number of parity drives due to the failure, the number of parity drives remains at three. Instead, only six data drives are utilized instead of seven. Thus, the data that would have been written to the seventh data drive is effectively lost.

Figure 5:
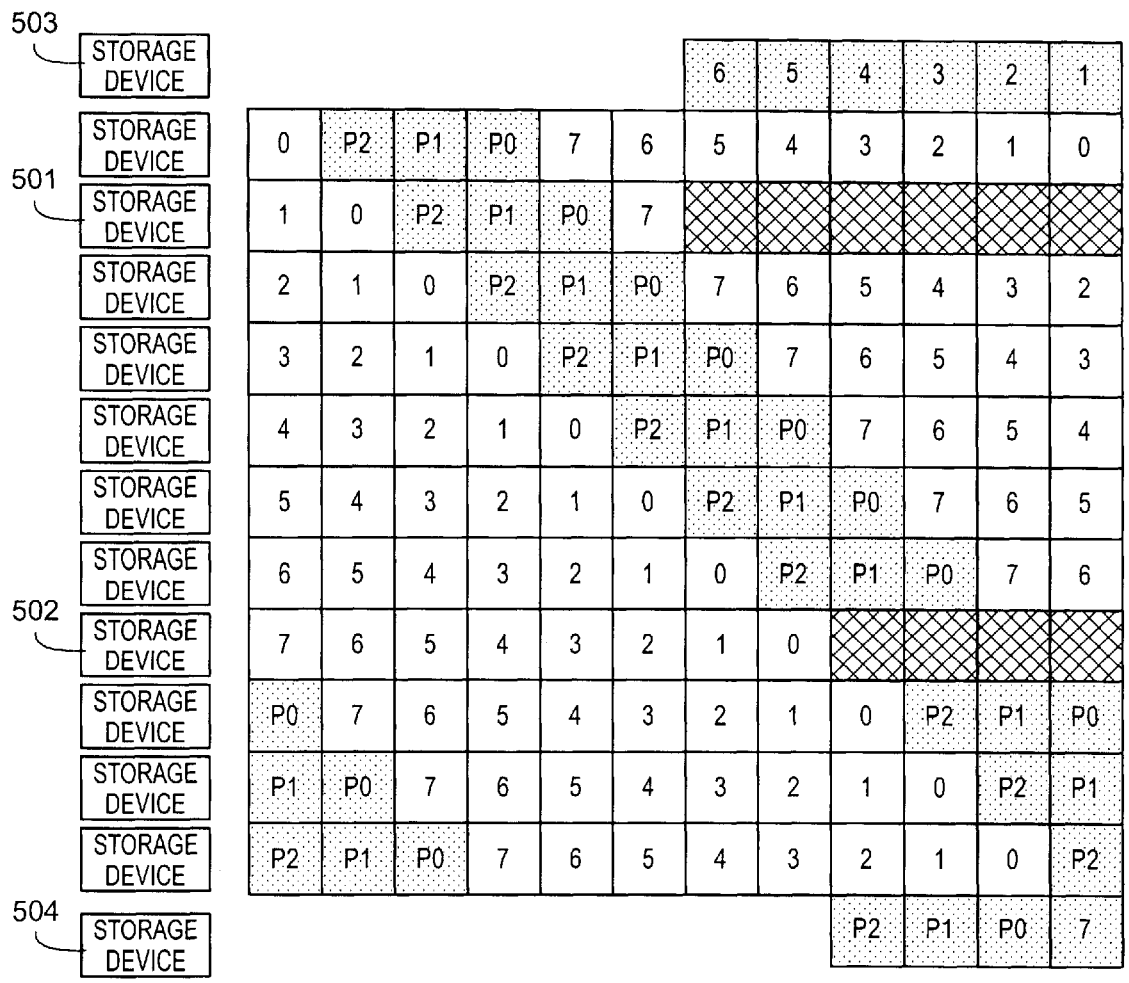
FIG. 5 is an exemplary diagram illustrating an operation of another embodiment of the present invention when a storage device in the array of storage devices fails.

FIG. 5 illustrates the fourth technique for accommodating failed storage devices. As shown in FIG. 5, two storage devices have failed during a write operation. The first failed storage device 501 fails during the writing of a seventh superblock and the second failed storage device 502 fails during the writing of a ninth superblock to the array of storage devices. With this third technique, rather than reducing the number of data stripes or parity stripes, spare drives are mapped into the rotation of the writing to the array of storage devices.

For example, the data that would have been written to the first failed storage device 501 is instead written to storage device 503. Thus, the header of the superblock changes from {1, 8, 3, 101, 0–1 . . . 5–10, 2–4} for the sixth superblock to {1, 8, 3, 102, 0 . . . 2 . . . 6–11, 3–5} for the seventh superblock. Thus, the spare storage device is mapped in as storage device number 11 and the header of the superblock indicates the mapping in of the spare storage device.

When the second failed storage device 502 fails, since the first failed storage device 501 has not been recovered, an additional spare storage device 504 is mapped into the write rotation. Data and parity information that would have been written to the second failed storage device 502 is now written to the spare storage device 504. As a result, the header changes from {1, 8, 3, 102, 0 . . . 2–3 . . . 7–11, 4–6} for the eighth superblock to {1, 8, 3, 104, 0 . . . 2–4 . . . 8–11, 5–6 . . . 12} for the ninth superblock. The second spare storage device 504 is mapped in as storage device 12 and the header is changed to reflect the parity information that would have been stored on failed storage device 502 being written to spare storage device 504.

Thus, with the present invention, the mapping-in of spare storage devices may be utilized to compensate for failed storage devices in the array of storage devices. The header for the superblock is changed to reflect the mapping in of the spare storage devices. In this way, data and parity information is not lost when one or more storage devices fail during a write or read operation. Similar to the second technique, this allows for increased throughput when compared to known RAIR systems.

In addition to the above, a combination of the second and fourth techniques or third and fourth techniques may also be utilized without departing from the spirit and scope of the present invention. For example, spare storage devices may be mapped into the write rotation until there are more failed storage devices than there are spare storage devices. When this occurs, the second technique may be utilized to accommodate the additional failed storage devices. Thus, spare storage devices may be mapped into the write rotation and then parity information may be reduced should additional storage devices fail. Alternatively, the number of data storage devices may be reduced should additional storage devices fail.

Figure 6:
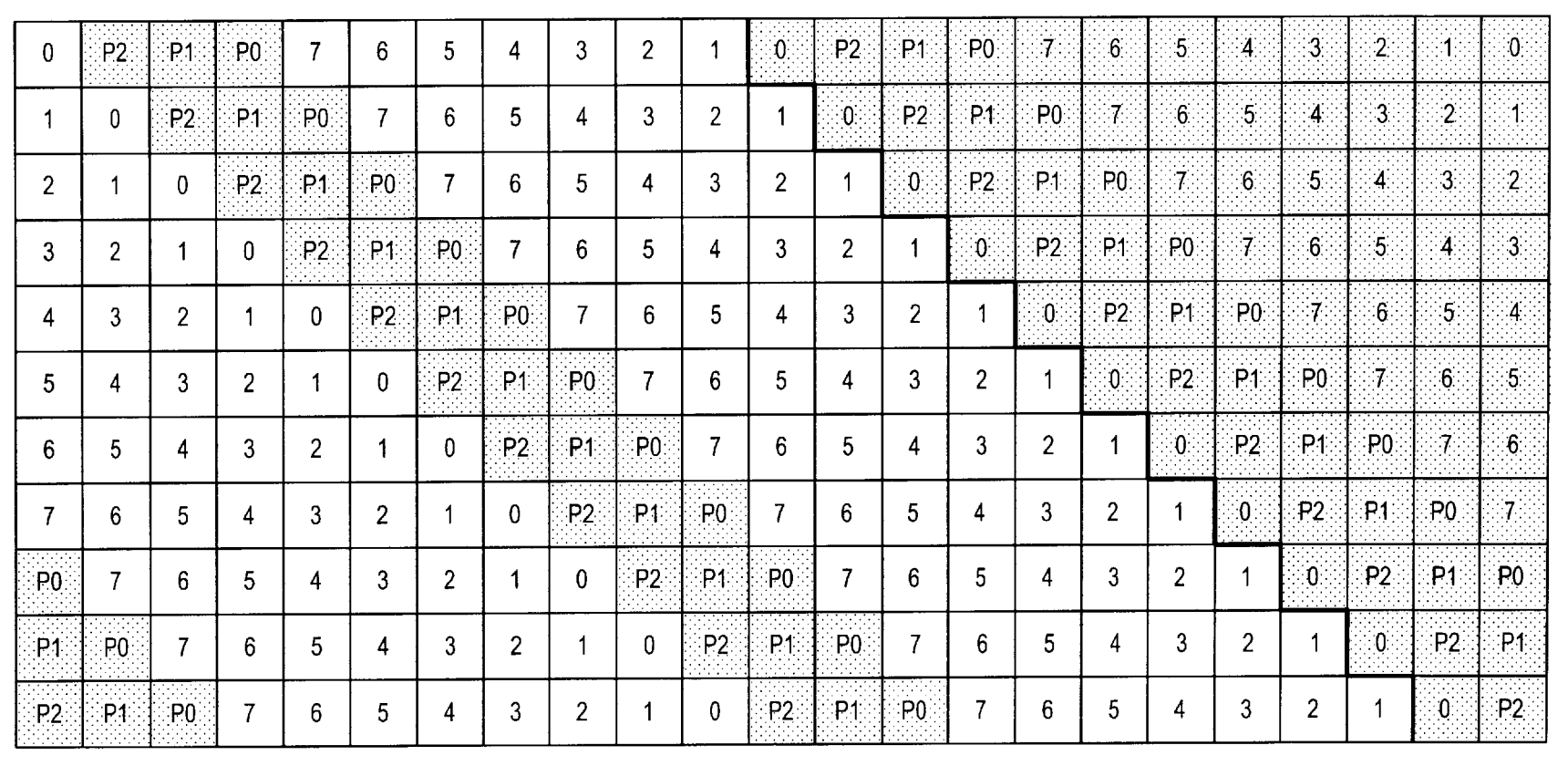

As mentioned above, the header information discussed so far represents a minimum set of header information for use with the present invention. Additional information may be included in the header information to make the header much more versatile. FIG. 6 provides an example table of additional information that may be included with the header information discussed above.

As shown in FIG. 6, the additional header information may include such information as status information, superblock size per stripe, superblock size, number of valid bytes in the superblock, date, header size, and the like. The information in the baseline, unit, min., max, header bytes, and scalability columns provide additional details regarding the values, and limits thereon, for this additional information.

Figure 7:
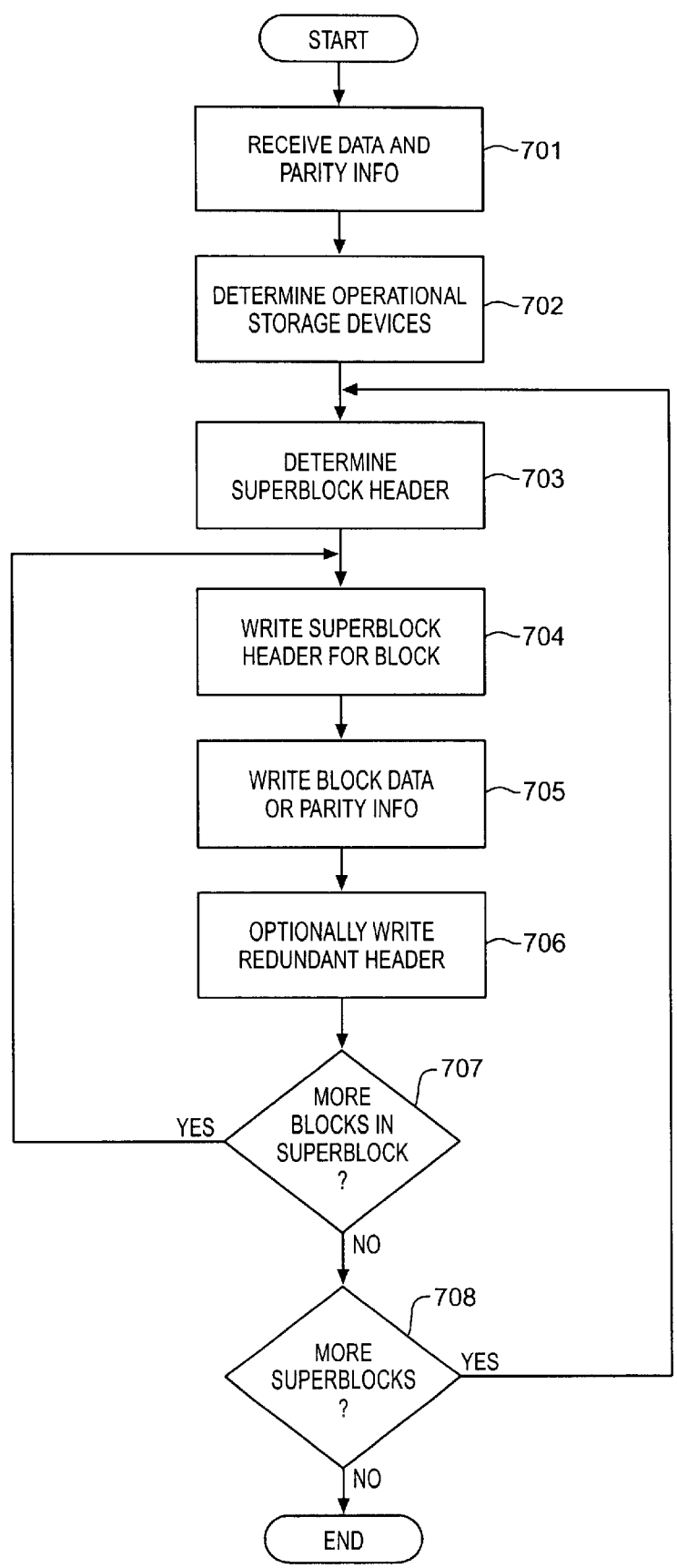
FIG. 7 is a flowchart outlining an exemplary operation according to one embodiment of the present invention.

FIG. 7 is a flowchart outlining an exemplary operation of the present invention when writing data and parity information to a storage medium. As shown in FIG. 7, the operating starts with receiving data and parity information that is to be written to the virtual volume, i.e. the array of storage devices (step 701). Then, it is determined which storage devices in the array of storage devices are operational (step 702). Based on the operational storage devices, the superblock header is determined (step 703) and is written to a storage device in the array of storage devices that is to store the first data block in the superblock (step 704).

Thereafter, the data block or parity information is written to the storage device (step 705). Optionally, the superblock header may be repeated as a redundant header at the end of the data block or parity information (step 706). It is then determined whether there are more blocks in the superblock that is being written (step 707). If there are more blocks to be written, the operating returns to step 704. If there are no more blocks, it is then determined whether there are more superblocks to be written to the virtual volume (step 708). If there are more superblocks, the operation returns to step 703. Otherwise, the operation ends.

In an alternative embodiment, the detection of a failed storage device may be performed at the time that a write operation is attempted to the storage device. If the write operation encounters a failed storage device, the data block or parity information may then be written to either the next available storage device with the number of parity stripes reduced, or may be written to a spare storage device in a manner set forth above.

In either case, the superblock header for the block may be modified to reflect the failure of the storage device. Thus, the superblock headers for blocks written prior to the failure will be different from the superblock headers of the blocks written after the failure. By looking at the superblock headers for each block of a superblock, an error can be identified and a failed storage device may be identified based on a change in the superblock header within the superblock.

Figure 8:
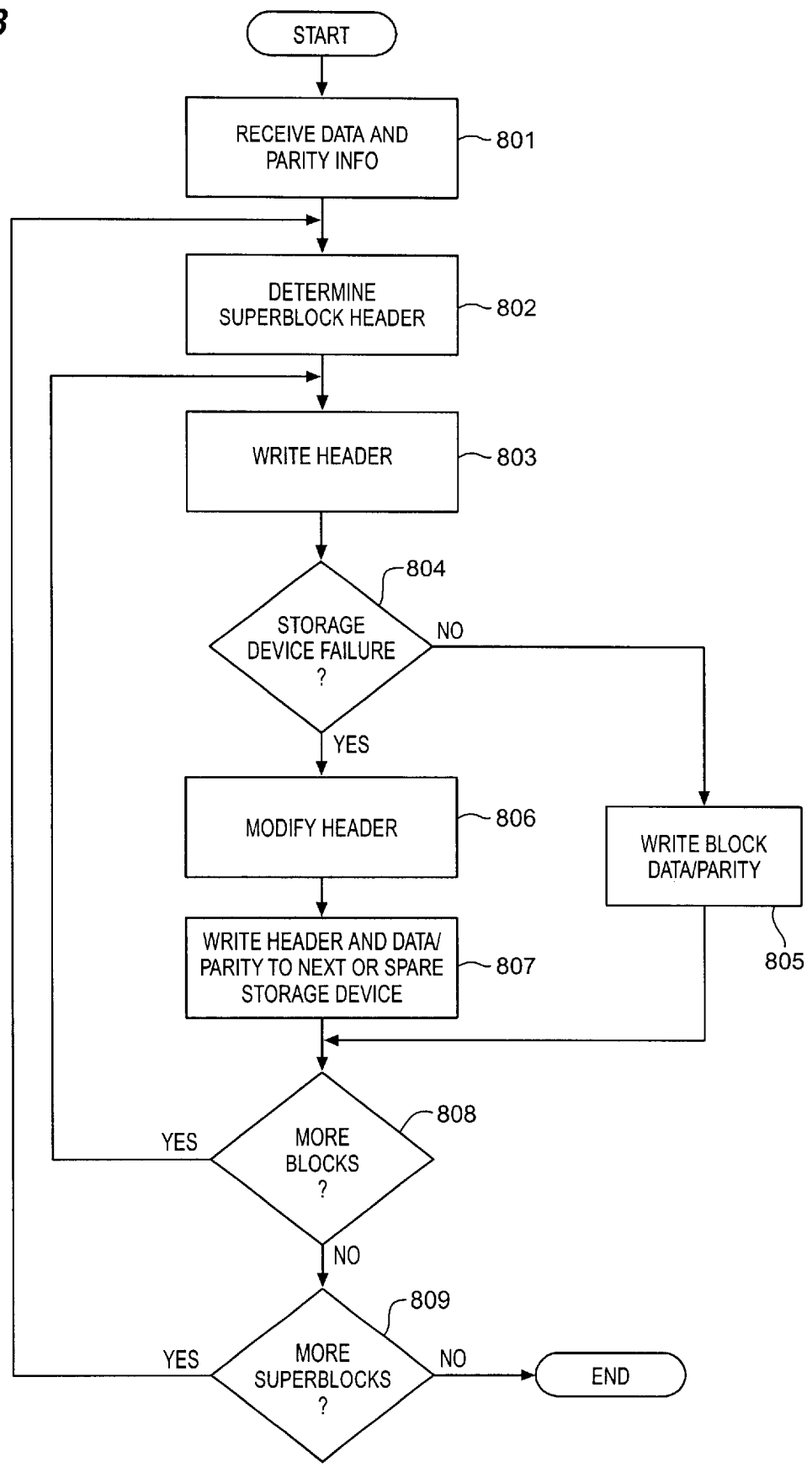
FIG. 8 is a flowchart outlining an exemplary operation according to another embodiment of the present invention.

FIG. 8 is a flowchart outlining an exemplary operation of the present invention according to the above alternative embodiment. As shown in FIG. 8, the operation starts with receiving data and parity information that is to be written to the virtual volume (step 801). The superblock header is then determined (step 802) and a write attempt is made to the storage device (step 803).

A determination is then made as to whether there was a failure of the storage device during the write attempt (step 804). If not, the block data or parity information is then written to the storage device (step 805). If there was a failure, the superblock header is modified in view of the storage device failure (step 806) and the modified header and data or parity information is written to either the next available or spare storage device (step 807).

A determination is then made as to whether or not there are more blocks in the superblock that is being written (step 808). If so, the operation returns to step 803. If not, a determination is made as to whether or not there are more superblocks (step 809). If there are more superblocks, the operation returns to step 802. If there are no more superblocks, the operation ends.

Thus, the present invention provides a system, apparatus and method in which header information is used to provide an accurate indication of the location of data and parity information in a virtual volume. The header information allows data and parity information to be written to other storage devices, such as a spare storage device, in the event of a failure. In this way, the overall throughput is increased since reconstruction of lost data is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for storing data to an array of storage devices, comprising:

generating metadata identifying a number of data storage devices and a number of redundancy information storage devices in the array of storage devices; and storing a superblock of the data to the array of storage devices, wherein the superblock is comprised of a plurality of blocks, and wherein each of the plurality of blocks is stored on a different storage device in the array of storage devices along with the metadata.

2. The method of claim 1, wherein the metadata further identifies device relationships pertaining to a specific order of storing information on the array of storage devices and optional relationship change information.

3. The method of claim 1, wherein the redundancy information includes at least one of parity information, Reed Solomon information, and information corresponding to a mixture of redundancy types.

4. The method of claim 1, wherein the metadata further includes one or more of a virtual volume identification, a present superblock sequence number, a physical volume identifier for a data stripe, a physical volume identifier for a parity stripe, and optionally an identifier of a change made to the metadata.

5. The method of claim 1, wherein the metadata has the form:

$\{vv, n, p, k, pvidd_0 \ldots pvidd_{n-1}, pvidp_0 \ldots pvidp_{p-1}\}$ wherein vv is a virtual volume identification, n is a number of data stripes, p is a number of parity stripes, k is a present superblock sequence number, $pvidd_i$ is a physical volume identifier for a data stripe I and I=0 to n−1, and $pvidp_j$ is a physical volume identifier for a parity stripe j and j=0 to p−1.

6. The method of claim 1, wherein the superblock is a portion of a data chunk written to the array of storage devices in a rotating manner.

7. The method of claim 1, wherein the array of storage devices define a virtual volume for a computing system.

8. The method of claim 1, wherein if a storage device, in the array of storage devices, fails during storing of the superblock, the block that was to be stored to the failed storage device is abandoned and recreated using parity information.

9. The method of claim 1, wherein if a storage device, in the array of storage devices, fails during storing of the superblock, the number of parity storage devices in the array of storage devices is reduced by allocating one of the parity storage devices for storage of a block that was intended for the failed storage device.

10. The method of claim 1, wherein if a storage device, in the array of storage devices, fails during storing of the superblock, the block that was to be stored to the failed storage device is stored to a spare storage device.

11. The method of claim 1, wherein if a storage device, in the array of storage devices, fails during storing of the superblock, the superblock is restriped to use fewer storage devices.

12. The method of claim 1, wherein each block in the superblock is self consistent and contains metadata that describes the block's relationship to all other blocks in the superblock.

13. The method of claim 1, wherein if a failure of a storage device in the array of storage devices is encountered, a metadata block is appended to an end of each block in the superblock that has already been stored to a storage device.

14. The method of claim 13, wherein a block that was intended to be stored on the failed storage device is stored on an alternative storage device and an identical metadata block is stored both before and after the block on the alternative storage device.

15. The method of claim 1, wherein in the event of a failure of a storage device in the array of storage devices, the metadata is modified to reflect the failure of the storage device.

16. The method of claim 1, wherein the plurality of blocks include blocks of data and zero or more blocks of parity information.

17. The method of claim 1, wherein the array of storage devices is a redundant array of removable storage devices.

18. The method of claim 1, wherein the array of storage devices is one of a redundant array of independent tape system, a redundant array of independent disk system, and a redundant array of independent removable storage devices system.

19. The method of claim 1, wherein generating metadata identifying a number of data storage devices and a number of parity information storage devices includes determining which of the storage devices in the array of storage devices are operational.

20. The method of claim 1, wherein storing the superblock to the array of storage devices includes repeatedly, for each storage device in the array of storage devices, writing a header to the storage device, the header containing the metadata, writing the data and then writing the header again.

21. An apparatus for storing data to an array of storage devices, comprising:

an array of storage devices; and a controller coupled to the array of storage devices, wherein the controller generates metadata identifying a number of data storage devices and a number of parity information storage devices in the array of storage devices, and stores a superblock of the data to the array of storage devices, wherein the superblock is comprised of a plurality of blocks, and wherein each of the plurality of blocks is stored on a different storage device in the array of storage devices along with the metadata.

22. The apparatus of claim 21, wherein the metadata further includes one or more of a virtual volume identification, a present superblock sequence number, a physical volume identifier for a data stripe, a physical volume identifier for a parity stripe, and optionally an identifier of a change made to the metadata.

23. The apparatus of claim 21, wherein the metadata has the form:

$\{vv, n, p, k, pvidd_0 \ldots pvidd_{n-1}, pvidp_0 \ldots pvidp_{p-1}\}$ wherein vv is a virtual volume identification, n is a number of data stripes, p is a number of parity stripes, k is a present superblock sequence number, $pvidd_i$ is a physical volume identifier for a data stripe I and I=0 to n−1, and $pvidp_j$ is a physical volume identifier for a parity stripe j and j=0 to p−1.

24. The apparatus of claim 21, wherein the superblock is a portion of a data chunk written to the array of storage devices in a rotating manner.

25. The apparatus of claim 21, wherein the array of storage devices define a virtual volume for a computing system.

26. The apparatus of claim 21, wherein if a storage device, in the array of storage devices, fails during storing of the superblock, the controller abandons the block that was to be stored to the failed storage device and recreates the block using parity information.

27. The apparatus of claim 21, wherein if a storage device, in the array of storage devices, fails during storing of the superblock, the controller reduces the number of parity storage devices in the array of storage devices by allocating one of the parity storage devices for storage of a block that was intended for the failed storage device.

28. The apparatus of claim 21, wherein if a storage device, in the array of storage devices, fails during storing of the superblock, the controller stores the block that was to be stored to the failed storage device to a spare storage device.

29. The apparatus of claim 21, wherein if a storage device, in the array of storage devices, fails during storing of the superblock, the controller restripes the superblock is to use fewer storage devices.

30. The apparatus of claim 21, wherein each block in the superblock is self consistent and contains metadata that describes the block's relationship to all other blocks in the superblock.

31. The apparatus of claim 21, wherein if a failure of a storage device in the array of storage devices is encountered, the controller appends a metadata block is to an end of each block in the superblock that has already been stored to a storage device in the array of storage devices.

32. The apparatus of claim 31, wherein the controller stores a block that was intended to be stored on the failed storage device to an alternative storage device and stores an identical metadata block both before, after the block on the alternative storage device, and optionally an identifier of a change made to the metadata.

33. The apparatus of claim 21, wherein in the event of a failure of a storage device in the array of storage devices, the controller modifies the metadata to reflect the failure of the storage device.

34. The apparatus of claim 21, wherein the plurality of blocks include blocks of data and zero or more blocks of parity information.

35. The apparatus of claim 21, wherein the array of storage devices is a redundant array of removable storage devices.

36. The apparatus of claim 21, wherein the array of storage devices is one of a redundant array of independent tape system, a redundant array of independent disk system, and a redundant array of independent removable storage devices system.

37. The apparatus of claim 21, wherein the controller stores the superblock to the array of storage devices by repeatedly, for each storage device in the array of storage devices, writing a header to the storage device, the header containing the metadata, writing the data and then writing the header again.

38. A computer program product in a computer readable medium for storing data to an array of storage devices, comprising:

first instructions for generating metadata identifying a number of data storage devices and a number of parity information storage devices in the array of storage devices; and second instructions for storing a superblock of the data to the array of storage devices, wherein the superblock is comprised of a plurality of blocks, and wherein each of the plurality of blocks is stored on a different storage device in the array of storage devices along with the metadata.

39. The computer program product of claim 38, wherein the metadata further includes one or more of a virtual volume identification, a present superblock sequence number, a physical volume identifier for a data stripe, and a physical volume identifier for a parity stripe.

40. The computer program product of claim 38, wherein the metadata has the form:

$\{vv, n, p, k, pvidd_0 \ldots pvidd_{n-1}, pvidp_0 \ldots pvidp_{p-1}\}$ wherein vv is a virtual volume identification, n is a number of data stripes, p is a number of parity stripes, k is a present superblock sequence number, $pvidd_i$ is a physical volume identifier for a data stripe I and I=0 to n−1, and $pvidp_j$ is a physical volume identifier for a parity stripe j and j=0 to p−1.

41. The computer program product of claim 38, wherein the superblock is a portion of a data chunk written to the array of storage devices in a rotating manner.

42. The computer program product of claim 38, wherein the array of storage devices define a virtual volume for a computing system.

43. The computer program product of claim 38, further comprising third instructions for abandoning and recreating a block that was intended for a failed storage device using parity information, if a storage device in the array of storage devices fails during storing of the superblock.

44. The computer program product of claim 38, further comprising third instructions for reducing a number of parity storage devices in the array of storage devices and allocating one of the parity storage devices for storage of a block that was intended for a failed storage device if a storage device in the array of storage devices fails during storing of the superblock.

45. The computer program product of claim 38, further comprising third instructions for storing a block that was to be stored to a failed storage device to a spare storage device if a storage device in the array of storage devices fails during storing of the superblock.

46. The computer program product of claim 38, further comprising third instructions for restriping the superblock to use fewer storage devices if a storage device in the array of storage devices fails during storing of the superblock.

47. The computer program product of claim 38, wherein each block in the superblock is self consistent and contains metadata that describes the block's relationship to all other blocks in the superblock.

48. The computer program product of claim 38, further comprising third instructions for appending a metadata block to an end of each block in the superblock that has already been stored to a storage device if a failure of a storage device in the array of storage devices is encountered.

49. The computer program product of claim 38, further comprising third instructions for modifying the metadata to reflect a failure of a storage device in the event of a failure of the storage device in the array of storage devices.

50. The computer program product of claim 38, wherein the plurality of blocks include blocks of data and zero or more blocks of parity information.

51. The computer program product of claim 38, wherein the first instructions for generating metadata identifying a number of data storage devices and a number of parity information storage devices includes instructions for determining which of the storage devices in the array of storage devices are operational.

52. The computer program product of claim 38, wherein the second instructions for storing the superblock to the array of storage devices includes instructions for repeatedly, for each storage device in the array of storage devices, writing a header to the storage device, the header containing the metadata, writing the data and then writing the header again.

\* \* \* \* \*